US011301700B2

(12) United States Patent
Kumar et al.

(10) Patent No.: US 11,301,700 B2
(45) Date of Patent: Apr. 12, 2022

(54) SYSTEM AND METHOD FOR SAFELY PARKING AN AUTONOMOUS VEHICLE ON SENSOR ANOMALY

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

(*) Notice: Subject to any disclaimer, the term of this patent is extended or adjusted under 35 U.S.C. 154(b) by 255 days.

(21) Appl. No.: 16/595,518

(22) Filed: Oct. 8, 2019

(65) Prior Publication Data
US 2021/0056326 A1 Feb. 25, 2021

(30) Foreign Application Priority Data
Aug. 22, 2019 (IN) ............... 201941033826

(51) Int. Cl.
*G06K 9/00* (2006.01)
*B62D 15/02* (2006.01)
*G05D 1/00* (2006.01)
*G05D 1/02* (2020.01)

(52) U.S. Cl.
CPC ..... *G06K 9/00812* (2013.01); *B62D 15/0285* (2013.01); *G05D 1/0088* (2013.01); *G05D 1/0214* (2013.01); *G06K 9/00798* (2013.01); *G06K 9/00805* (2013.01)

(58) Field of Classification Search
CPC ........... G06K 9/00812; G06K 9/00805; G06K 9/00798; B62D 15/0285; G05D 1/0214
See application file for complete search history.

(56) References Cited

U.S. PATENT DOCUMENTS

| | | | |
|---|---|---|---|
| 6,151,539 A | 11/2000 | Bergholz et al. | |
| 9,523,984 B1 | 12/2016 | Herbach et al. | |
| 10,114,374 B2 | 10/2018 | Tao et al. | |
| 2017/0057510 A1* | 3/2017 | Herbach ............ | B62D 15/0265 |
| 2017/0123428 A1 | 5/2017 | Levinson et al. | |
| 2017/0297565 A1* | 10/2017 | Joyce ................... | B60W 50/029 |
| 2019/0027042 A1* | 1/2019 | Fujishima ............ | B60W 30/06 |
| 2020/0094816 A1* | 3/2020 | Krekel ............... | B62D 15/0285 |
| 2020/0122775 A1* | 4/2020 | Hasejima ........... | B60K 31/0075 |
| 2021/0163021 A1* | 6/2021 | Frazzoli ............... | H04W 4/00 |
| 2021/0171023 A1* | 6/2021 | Shalev-Shwartz ..................... B60W 50/087 |

* cited by examiner

*Primary Examiner* — Kenneth J Malkowski
(74) *Attorney, Agent, or Firm* — Finnegan, Henderson, Farabow, Garrett & Dunner, LLP

(57) ABSTRACT

The present invention relates to a method for safely parking an autonomous vehicle on sensor anomaly. Based on current position of the AV, an angular velocity and curvature required for the AV to reach a safe parking space may be determined, upon detecting non-working of at least one primary sensor associated with the AV. Further, one or more obstacles proximal to the AV may be detected using one or more secondary sensors attached to the AV. Furthermore, based on detection of the one or more obstacles, the AV may be navigated in a track by maintaining a safe distance from the one or more obstacles. Finally, the AV may be navigated along the determined curvature upon detecting absence of the one or more obstacles to reach the safe parking space at the edge of the road.

18 Claims, 14 Drawing Sheets

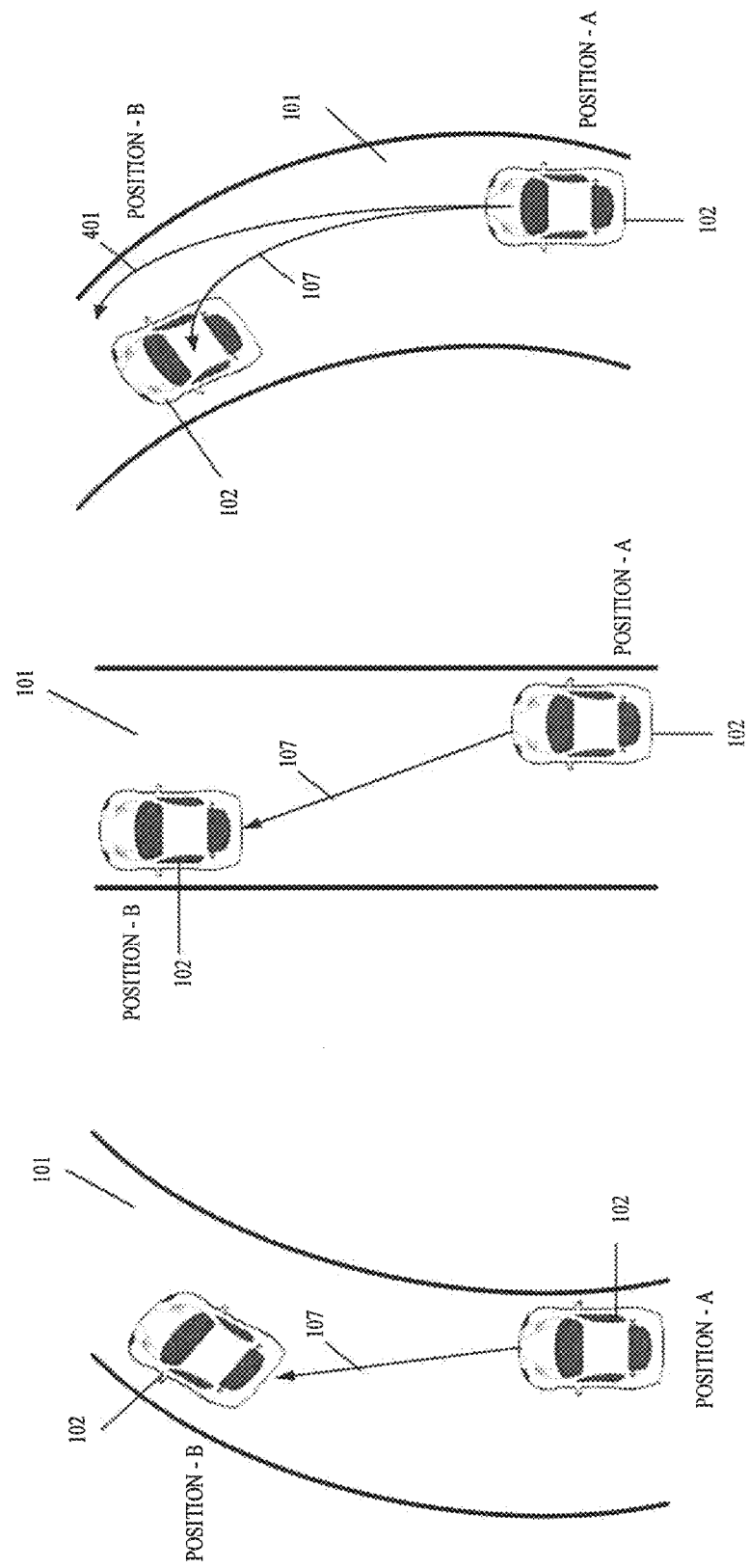

| AV linear Velocity at (weight cond 1) | Distance covered in 5 sec (meter) | Distance covered in 10 sec (meter) |
|---|---|---|
| 60 km/s | 23 | 46 |
| 50 km/s | 19 | 38 |
| 40 km/s | 16 | 32 |
| 30 km/s | 12 | 24 |
| 20 km/s | 9 | 18 |

TABLE -1

| AV angular velocity (rad) | Distance covered in 5 sec (meter) for 40km/sec | Lateral Shift (meter) 'S' |
|---|---|---|
| 0.5 | 23 | 0.2 |
| 0.8 | 19 | 0.35 |
| 1.2 | 16 | 0.5 |
| 1.5 | 12 | 0.65 |
| 2.0 | 9 | 0.8 |

TABLE – 2A

| AV angular velocity (rad) | Distance covered in 5 sec (meter) for 50km/sec | Lateral Shift (meter) 'S' |
|---|---|---|
| 0.5 | 20 | 0.3 |
| 0.8 | 18 | 0.45 |
| 1.2 | 15 | 0.6 |
| 1.5 | 12 | 0.8 |
| 2.0 | 7 | 1.0 |

TABLE – 2B

FIGURE 12

| Vehicle linear Velocity (weight cond 1) | Max angle shift per sec | Distance covered in 5 sec (meter) | Distance covered in 8 sec (meter) |
|---|---|---|---|
| 60 km/s | 1.5 degree | 15 | 20 |
| 50 km/s | 2 degrees | 12 | 16 |
| 40 km/s | 3.5 degree | 10 | 13 |
| 30 km/s | 5 degrees | 7 | 10 |
| 20 km/s | 7 degrees | 6 | 9 |

TABLE - 1

FIGURE 13

SYSTEM AND METHOD FOR SAFELY PARKING AN AUTONOMOUS VEHICLE ON SENSOR ANOMALY

TECHNICAL FIELD

The present disclosure relates to the field of navigating an Autonomous Vehicle (AV). Particularly, but not exclusively, the present disclosure relates to method for safely parking an autonomous vehicle on sensor anomaly.

BACKGROUND

Generally, Autonomous Vehicle (AV) uses one or more sensors for example camera, LiDAR, RADAR, Inertial Measurement Units (IMU) and the like for accurately navigating the AV from a source location to a destination location. The one or more sensors associated with the AV may stop working or get partially damaged or malfunction or provide inappropriate results due to wear-n-tear over a period of time. During navigation of the AV, upon detecting an anomaly or a failure in the one or more sensors associated with the AV, the AV can no longer rely on the input data from the one or more failed sensors for navigating the AV. Further, the AV should safely park itself by navigating cautiously to prevent any collision or damage to other vehicles and environment.

An issue with the existing techniques is the lack of ability to determine a path required to safely park the AV upon detecting the failure in the one or more sensors.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

Disclosed herein is a method for safely parking an autonomous vehicle (AV), the method includes determining, based on a current position of the AV in a global path, an angular velocity and curvature required for the AV to reach a safe parking space towards an edge of a road upon detecting non-working of at least one primary sensor among a plurality of primary sensors associated with the AV. Further, the method includes detecting one or more obstacles proximal to the AV using one or more secondary sensors attached to the AV while navigating the AV along determined curvature. Furthermore, based on detecting the one or more obstacles proximal to the AV, navigating the AV in a track by maintaining a safe distance from the one or more obstacles using remaining primary sensors among the plurality of primary sensors upon detecting presence of the one or more obstacles proximal to the AV in the determined curvature. Finally, based on detecting the one or more obstacles proximal to the AV, navigating the AV along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

Embodiments of the present disclosure discloses a navigation unit for safely parking an autonomous vehicle (AV), the navigation unit including a plurality of primary sensors and one or more secondary sensors communicatively coupled to the navigation unit, wherein the one or more secondary sensors is configured to detect one or more obstacles proximal to the AV for navigating the AV, measure distance of an edge of a road, measure distance of a pedestrian surface and measure distance of a vehicle proximal to the AV. The navigation unit includes a processor and a memory communicatively coupled to the processor, wherein the memory stores the processor executable instructions, which, on execution, causes the processor to determine, based on a current position of the AV in a global path, an angular velocity and curvature required for the AV to reach safe parking space towards an edge of a road upon detecting non-working of at least one primary sensor among a plurality of primary sensors associated with the AV. Further, the processor is configured to detect one or more obstacles proximal to the AV using one or more secondary sensors attached to the AV while navigating the AV along determined curvature. Furthermore, based on detecting the one or more obstacles proximal to the AV, the processor is configured to navigate the AV in a track by maintaining a safe distance from the one or more obstacles using remaining primary sensors among the plurality of primary sensors upon detecting presence of the one or more obstacles proximal to the AV in the determined curvature. Finally, based on detecting the one or more obstacles proximal to the AV, the processor is configured to navigate the AV along the determined curvature at determined angular velocity using the remaining primary sensors and the one or more secondary sensors upon detecting absence of the one or more obstacles proximal to the AV in the determined curvature to reach safe parking space towards an edge of a road.

Embodiments of the present disclosure discloses a non-transitory computer readable medium including instructions stored thereon that when processed by at least one processor cause a device to perform operations including determining, based on a current position of the AV in a global path, an angular velocity and curvature required for the AV to reach a safe parking space towards an edge of a road upon detecting non-working of at least one primary sensor among a plurality of primary sensors associated with the AV. Further, detecting, one or more obstacles proximal to the AV using one or more secondary sensors attached to the AV while navigating the AV along determined curvature. Finally, based on detecting the one or more obstacles proximal to the AV, performing at least one of navigating the AV in a track by maintaining a safe distance from the one or more obstacles using remaining primary sensors among the plurality of primary sensors upon detecting presence of the one or more obstacles proximal to the AV in the determined curvature and navigating the AV along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE
ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4A shows an exemplary curvature and angular velocity determination for safely parking an autonomous vehicle when the road has a curve to the right side of the AV, in accordance with some embodiments of the present disclosure;

FIG. 4B shows an exemplary curvature and angular velocity determination for safely parking an autonomous vehicle when the road has a straight path ahead of the AV, in accordance with some embodiments of the present disclosure;

FIG. 4C shows an exemplary curvature and angular velocity determination for safely parking an autonomous vehicle when the road has a curve to the left side of the AV, in accordance with some embodiments of the present disclosure;

FIG. 12 shows an exemplary trajectory performance profile, in accordance with some embodiments of the present disclosure; and FIG. 13 shows an exemplary velocity-distance profile data, in accordance with some embodiments of the present disclosure.

Figure 1:
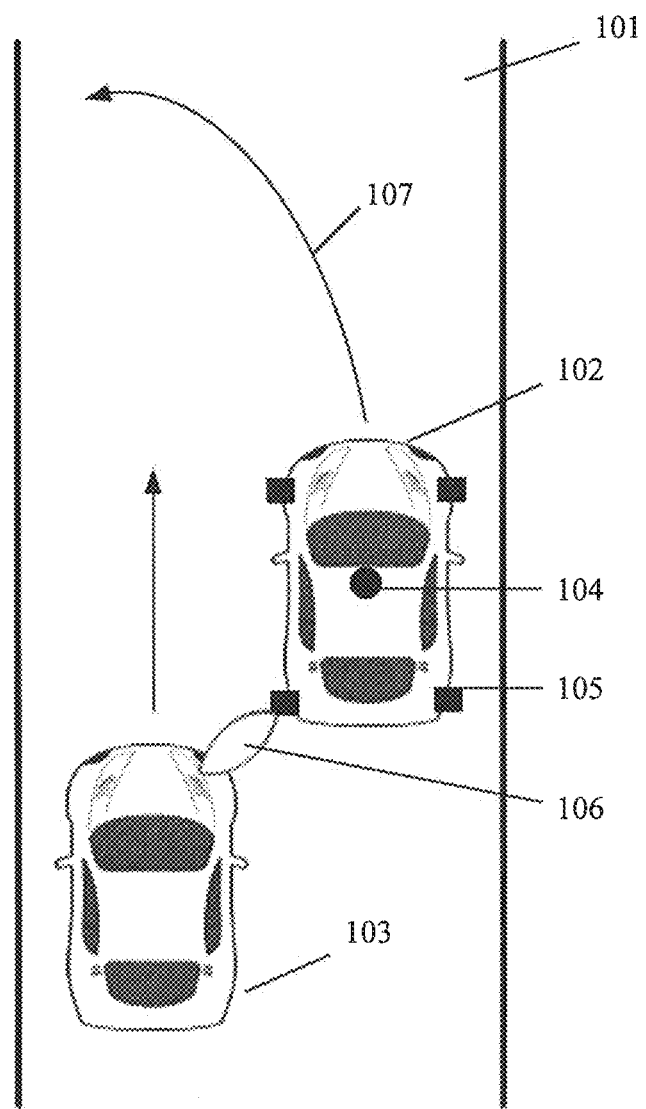
FIG. 1 shows an exemplary environment for safely parking an Autonomous Vehicle (AV), in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure describes a method for safely parking an autonomous vehicle (AV). Based on the current position of the AV in a global path, an angular velocity and curvature required for the AV to reach a safe parking space towards an edge of a road may be determined, upon detecting non-working of at least one primary sensor among a plurality of primary sensors associated with the AV. Further, one or more obstacles proximal to the AV may be detected using one or more secondary sensors attached to the AV while navigating the AV along determined curvature. Furthermore, based on detecting the one or more obstacles proximal to the AV, the AV may be navigated in a track by maintaining a safe distance from the one or more obstacles using remaining primary sensors among the plurality of primary sensors upon detecting presence of the one or more obstacles proximal to the AV in the determined curvature. Finally, the AV may be navigated along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for safely parking an Autonomous Vehicle (AV) (102), in accordance with some embodiments of the present disclosure. The AV (102) may be associated with a plurality of primary sensors (104) and one or more secondary sensors (105). The plurality of primary sensors (104) may include an imaging sensor, a RADAR, a Light Imaging, Detection and Ranging (LiDAR), an Inertial Measurement Units (IMUs), a wheel encoder and the like. The one or more secondary sensors (105) may include an ultrasonic sensor, proximity sensor and the like. The AV (102) may use the plurality of primary sensors (104) for navigating along a road (101) or track from a source location to a destination location. The navigation unit (200) associated with the AV may be used to navigate the AV along the road (101) by generating and applying a determined combination of linear and angular velocities selected from a trajectory performance profile (205) based on the inputs from the one or more primary sensors (104). The generation of combination of the linear and the angular velocities may repeat after a predefined time period for example 100 ms and may be applied to the wheelbase of the AV (102) for navigating the AV (102) along the road (101). Further, the one or more primary sensors (104) may be continuously monitored by the navigation unit (200) of the AV (102), to detect a failure or non-working or an anomaly of the at least one primary sensor among the plurality of primary sensors (104). The failure or non-working of the at least one primary sensor may be detected based on at least one of a presence or absence of a signal from the plurality of primary sensors (104), the range of values obtained from the signal of the plurality of primary sensors (104) and the like. The navigation unit (200), upon detecting the non-working of the at least one primary sensor among the plurality of primary sensors (104) associated with the AV (102), may determine, based on current position of the AV (102) in a global path, an angular velocity and a curvature (107) required for the AV (102) to reach a safe parking space towards the edge of the road (101) as shown in FIG. 1. The navigation unit (200) may activate the one or more secondary sensors (105), to detect the one or more obstacles (103) proximal to the AV (102) during the navigation of the AV (102) along the determined curvature (107). In an embodiment, the one or more secondary sensors (105) may transmit signals (106) and based on the received reflected signals (106) detect the one or more obstacles (103) proximal to the AV (102). The detection of the one or more obstacles proximal to the AV (102) includes detecting at least one of the one or more obstacles in front of the AV (102) and the one or more obstacles behind the AV (102) in the direction of the determined curvature (107), and determining distance of the one or more obstacles detected by the AV (102). For example, the one or more obstacles (103) may include at least one of a vehicle navigating in front of the AV (102) along the direction of the determined curvature (107), a vehicle approaching the AV (102) from behind the AV (102) along the direction of the determined curvature (107), a vehicle statically parked along the direction of the determined curvature (107), a barrier of the road (101), and the like.

Furthermore, the navigation unit (200) based on the one or more obstacles (103) navigates the AV (102) in a track along the road (101) by maintaining a safe distance from the one or more obstacles (103) using remaining primary sensors among the plurality of primary sensors (104). The remaining primary sensors may be indicative of the one or more primary sensors among the plurality of primary sensors (104) in a working condition. For example, upon detecting the failure of the at least one primary sensor camera, the navigation unit (200) may navigate the AV (102) in a track along the road (101) by maintaining a safe distance from the one or more obstacles (103) using the remaining primary sensors including at least one of the camera sensor, LiDAR sensor and IMU sensor in the working condition. The navigation unit (200), upon detecting absence of the one or more obstacles (103) navigates the AV (102) along the determined curvature (107) at determined angular velocity using the remaining primary sensors among the plurality of primary sensors (104) and the one or more secondary sensors (105) to reach the safe parking space towards the edge of the road (101) as shown in FIG. 1. The navigation unit (200) detects the reaching of the safe parking space by the AV (102) using the one or more secondary sensors (105) by identifying at least one of a pedestrian area within a predefined distance from the AV (102) and a low lying area with respect to the edge of the road (101) within the predefined distance from the AV (102). In an embodiment, the predefined distance may be set to, for example, 1 meter from the current position of the AV (102). In an embodiment, the safe parking space of the AV (102) may be towards the left side edge of the road (101). In another embodiment, the safe parking space of the AV (102) may be towards the right-side edge of the road (101).

In an embodiment, the one or more secondary sensors (105) may be housed at the four corners of the AV (102). The one or more secondary sensors (105) housed in front of the AV (102) may be used to detect the one or more obstacles (103) ahead of the AV (102) along the left and right directions of the AV (102). The one or more secondary sensors (105) housed at back of the AV (102) may be used to detect the one or more obstacles (103) behind the AV (102) along the left and right directions of the AV (102).

In an embodiment, the navigation unit (200) may reduce the speed of the AV (102) upon detecting the non-working of the at least one primary sensor among the plurality of primary sensors (104).

Figure 2:
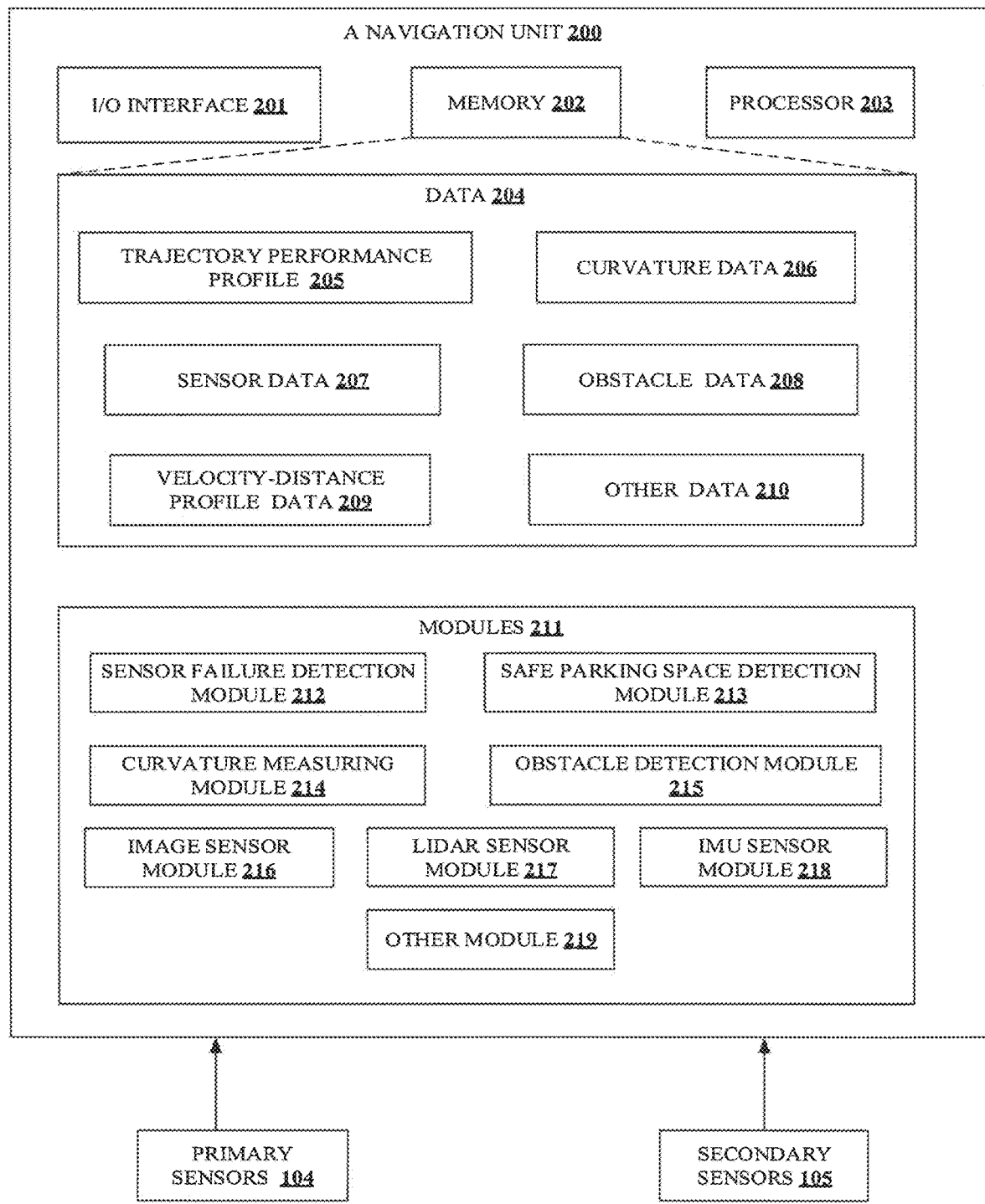
FIG. 2 shows a detailed block diagram of a navigation unit, in accordance with some embodiments of the present disclosure.

FIG. 2 shows a detailed block diagram of a navigation unit (200), in accordance with some embodiments of the present disclosure. The navigation unit (200) may be communicatively coupled to the plurality of primary sensors (104) and the one or more secondary sensors (105). The navigation unit (200) may include a Central Processing Unit ("CPU" or "processor") (203) and a memory (202) storing instructions executable by the processor (203). The processor (203) may include at least one data processor for executing user or system-generated requests. The memory (202) may be communicatively coupled to the processor (203). The navigation unit (200) further includes an Input/Output (I/O) interface (201). The I/O interface (201) may be coupled with the processor (203) through which an input signal or/and an output signal may be communicated. In one embodiment, the navigation unit (200) may receive the signals from the plurality of primary sensors (104) and the one or more secondary sensors (105) through the I/O interface (201).

In some implementations, the navigation unit (200) may include data (204) and modules (211). As an example, the data (204) and modules (211) may be stored in the memory (202) configured in the navigation unit (200) as shown in the FIG. 2. In one embodiment, the data (204) may include, for example, a trajectory performance profile (205), curvature data (206), sensor data (207), obstacle data (208), velocity-distance profile data (209) and other data (210). In the illustrated FIG. 2, data (204) are described herein in detail.

In an embodiment, the trajectory performance profile (205) may include a distance covered by the AV (102) corresponding to an applied linear velocity for a duration of "t" seconds at a certain weight condition of the AV (102). Further, the trajectory performance profile (205) may include the distance covered by the AV (102) at a certain linear velocity of the AV (102) as shown in TABLE-1 of FIG. 12 and a lateral shift covered by the AV (102) corresponding to the angular velocity applied to the AV (102), where the AV (102) may be travelling with a certain linear velocity as shown in TABLE-2A and TABLE-2B of the FIG. 12. The TABLE-2A of the FIG. 12 indicates the distance covered by the AV (102) travelling at a linear velocity of 40 km/sec and the lateral shift covered by the AV (102) for the applied angular velocity and TABLE-2B of the FIG. 12 indicates the distance covered by the AV (102) travelling at a linear velocity of 50 km/sec and the lateral shift covered by the AV (102) for the applied angular velocity.

In an embodiment, the curvature data (206) may include a measured curvature (401). The measured curvature (401) indicates a curve of a road segment ahead of the AV (102) which is determined to navigate the AV (102) along the global path when the plurality of primary sensors (104) is in working condition. The global path may be a path determined for navigating the AV (102) from the source location to the destination location based on a reference map.

In an embodiment, the sensor data (207) may include signals (106) received from the plurality of primary sensors (104) and one or more secondary sensors (105). For example, an image captured by an imaging sensor (for example, visible light camera, infrared camera and the like), a three-dimensional image of an environment captured by Light Detection and Ranging (LiDAR) and the like. Further, the sensor data may include one or more objects detected, distance of the objects detected from the signals (106) received from the plurality of primary sensors (104) and one or more secondary sensors (105). The one or more objects may include at least one of vehicles, road edge, one or more lane markers, road signs, pedestrian, pedestrian area, road bump, low lying area with respect to the road edge and the like.

In an embodiment, the obstacle data (208) may include position of the one or more obstacles (103) proximal to the AV (102) and the distance of the one or more obstacles from the AV (102). For example, the one or more obstacles may be detected at a distance of 2 meters in front of the AV (102) along the left side of the AV (102).

In an embodiment, the velocity-distance profile data (209) may include an angular shift achieved per second by the AV (102) corresponding to the current linear velocity of the AV (102), and the distance covered by the AV (102) for a duration of "t" seconds as shown in TABLE-1 of the FIG. 13. The velocity-distance profile data (209) may be used to navigate the AV (102) using the working primary sensor for example IMU.

In an embodiment, the other data (210) may include the global path from the source location to the destination location, the reference map for localization of the AV (102) and the like.

In some embodiments, the data (204) may be stored in the memory (202) in form of various data structures. Additionally, the data (204) may be organized using data models, such as relational or hierarchical data models. The other data (210) may store data, including temporary data and temporary files, generated by the modules (211) for performing the various functions of the navigation unit (200).

In some embodiments, the data (204) stored in the memory (202) may be processed by the modules (211) of the navigation unit (200). The modules (211) may be stored within the memory (202). In an example, the modules (211) communicatively coupled to the processor (203) configured in the navigation unit (200), may also be present outside the memory (202) as shown in FIG. 2 and implemented as hardware. As used herein, the term modules (211) may refer to an Application Specific Integrated Circuit (ASIC), a FPGA (Field Programmable Gate Array), an electronic circuit, a processor (shared, dedicated, or group) and memory (202) that execute one or more software or firmware programs, a combinational logic circuit, and/or other suitable components that provide the described functionality. In some other embodiments, the modules (211) may be implemented using at least one of ASICs and FPGAs.

In one implementation, the modules (211) may include, for example, sensor failure detection module (212), safe parking space detection module (213), curvature measuring module (214), obstacle detection module (215), image sensor module (216), LiDAR sensor module (217), IMU sensor module (218), and other module (219). It may be appreciated that such afore-mentioned modules (211) may be represented as a single module or a combination of different modules.

In an embodiment, the sensor failure detection module (212) may be used to detect the failure or non-working or anomaly of the at least one primary sensor among the plurality of sensors associated with the navigation unit (200) of the AV (102).

In an embodiment, the safe parking space detection module (213) may be used to detect the reaching of the safe parking space by the AV (102), using the one or more secondary sensors (105) by identifying at least one of a pedestrian area within a predefined distance from the AV (102) and a low lying area with respect to the edge of the road within the predefined distance from the AV (102). The predefined distance may be set to the distance of the road (101) from the AV (102). For a right-handed driving system, the safe parking space may be towards the road edge in the left direction of the AV (102). For a left-handed driving system, the safe parking space may be towards the road edge in the right direction of the AV (102).

Figure 9:
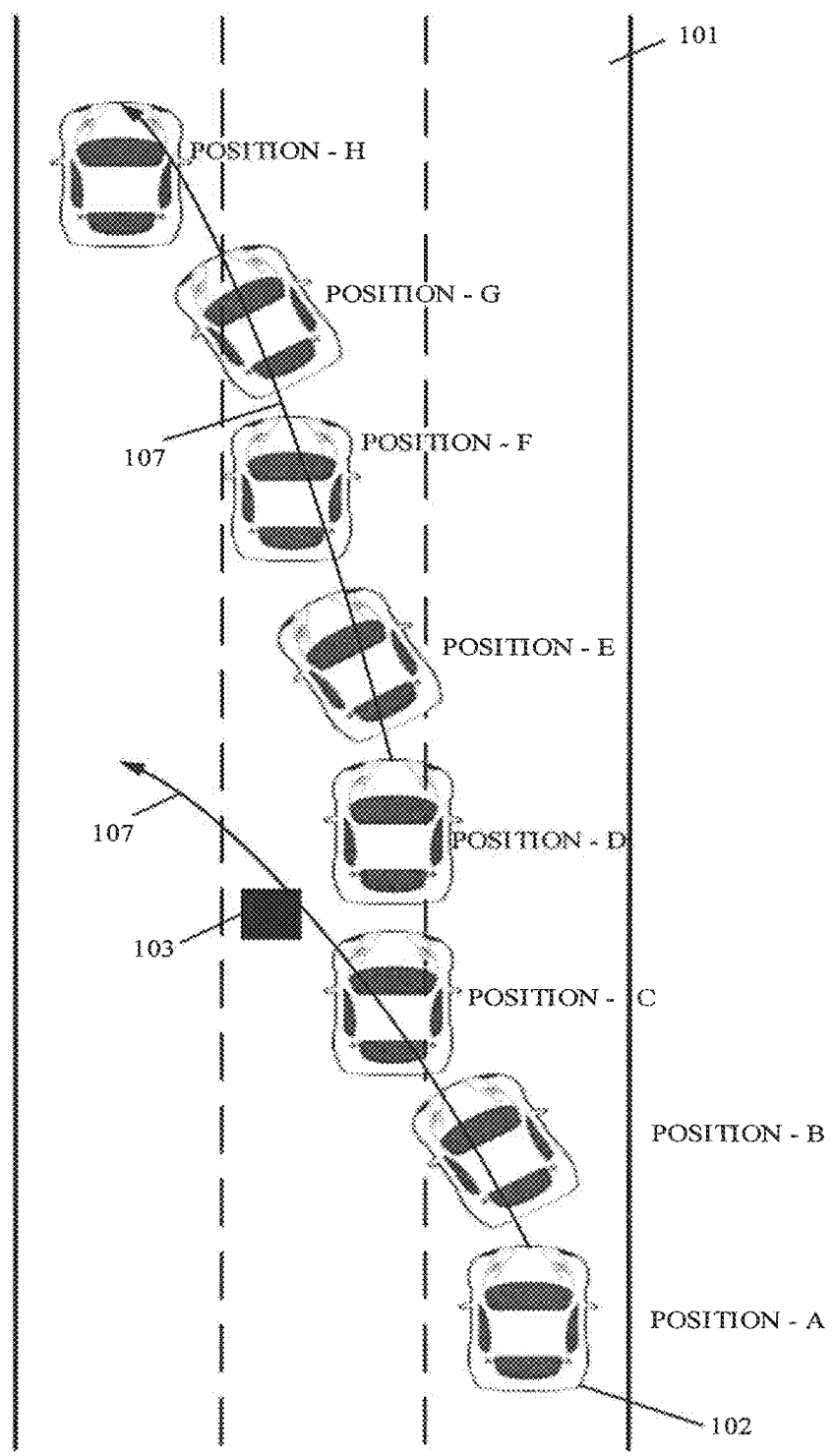
FIG. 9 shows an exemplary safely parking of an autonomous vehicle using impulsive velocity, in accordance with some embodiments of the present disclosure.

In an embodiment, the curvature measuring module (214) may be used to determine a curvature required for the AV (102) to reach safe parking space towards an edge of a road (101). For reaching the safe parking space in case of the road (101) being a straight path or having a curve to the direction opposite to the safe parking space, the navigation unit (200) may determine the curvature as linear path for guided shifting of the AV (102) to reach the safe parking space as shown in FIG. 9. For reaching the safe parking space in case of the road (101) having a curve in the direction of the safe parking space, the navigation unit (200) may determine a curvature more than the measured curvature (401). For example, the determined curvature (107) may be 2 times the measured curvature (401). As shown in FIG. 4A and FIG. 4B the navigation unit (200) may determine a linear path for the AV (102) to reach safe parking space towards an edge of a road (101) in case of the road (101) being a straight path or having a curve to the direction opposite to the safe parking space. Further, as shown in FIG. 4C, the navigation unit (200) may determine a curvature more than the measured curvature (401) for the AV (102) to reach safe parking space towards an edge of a road (101) in case of the road (101) having a curve in the direction of the safe parking space.

In an embodiment, the obstacle detection module (215) may be used to detect the one or more obstacles (103) proximal to the AV (102) along the determined curvature (107). The one or more secondary sensors (105) may be used to detect the one or more obstacles (103) proximal to the AV. The one or more secondary sensors (105) may transmit signals (106) and measure the time taken for the reflected signals (106) from the one or more obstacles to reach the one or more secondary sensors (105). Further, the distance from the one or more obstacles (103) may be determined using the relationship between distance, time and speed.

In an embodiment, the image sensor module (216) may be used to navigate the AV (102) along a track on the road (101) upon detecting the one or more obstacles (103) in the determined curvature (107). The image sensor module (216) may include a visible light camera, an infrared camera and the like. The image sensor module (216) may capture images and detect the one or more objects such as road signs in the captured image using the existing image processing techniques like edge detection, object recognition and the like.

In an embodiment, the LiDAR sensor module (217) may be used to navigate the AV (102) along a track on the road (101) upon detecting the one or more obstacles (103) in the determined curvature (107). LiDAR stands for light imaging, detection and ranging. The LiDAR sensor module (217) may comprise a LiDAR sensor and controller/processor. The LiDAR sensor may emit invisible laser rays. The controller/processor may scan and detect objects in near vicinity or far vicinity of the LiDAR sensor and create a 3D map of the objects and surroundings around the LiDAR sensor. The Field of View (FOV) of the LiDAR sensor may comprise a range of angle measured in degrees around the AV (102) for emitting the laser rays to scan and detect the objects. The laser rays emitted by the LiDAR sensor travel outward until the rays encounter an object. Upon encountering the object, the laser LiDAR data may be used for measuring the orientation of the object so that navigation unit (200) may navigate the AV (102) by maintaining the measured orientation with respect to the object.

In an embodiment, the IMU sensor module (218) may be used to navigate the AV (102) along a track on the road (101) upon detecting the one or more obstacles (103) in the determined curvature (107). The inertial measurement unit (IMU) may be used to directly measure three linear acceleration components and three angular rate components of the AV (102). The IMU may be used to measure one or more characteristics pertaining to the dynamics of the AV (102) for example location of the AV (102), position of the AV (102) on the road (101), direction of the AV (102), orientation of the AV (102) and velocity of the AV (102).

In an embodiment, the other module (219) may be used to generate and apply the determined combination of the linear and the angular velocities to the wheelbase of the AV (102), for navigating the AV (102) along the determined curvature (107).

Figure 3:
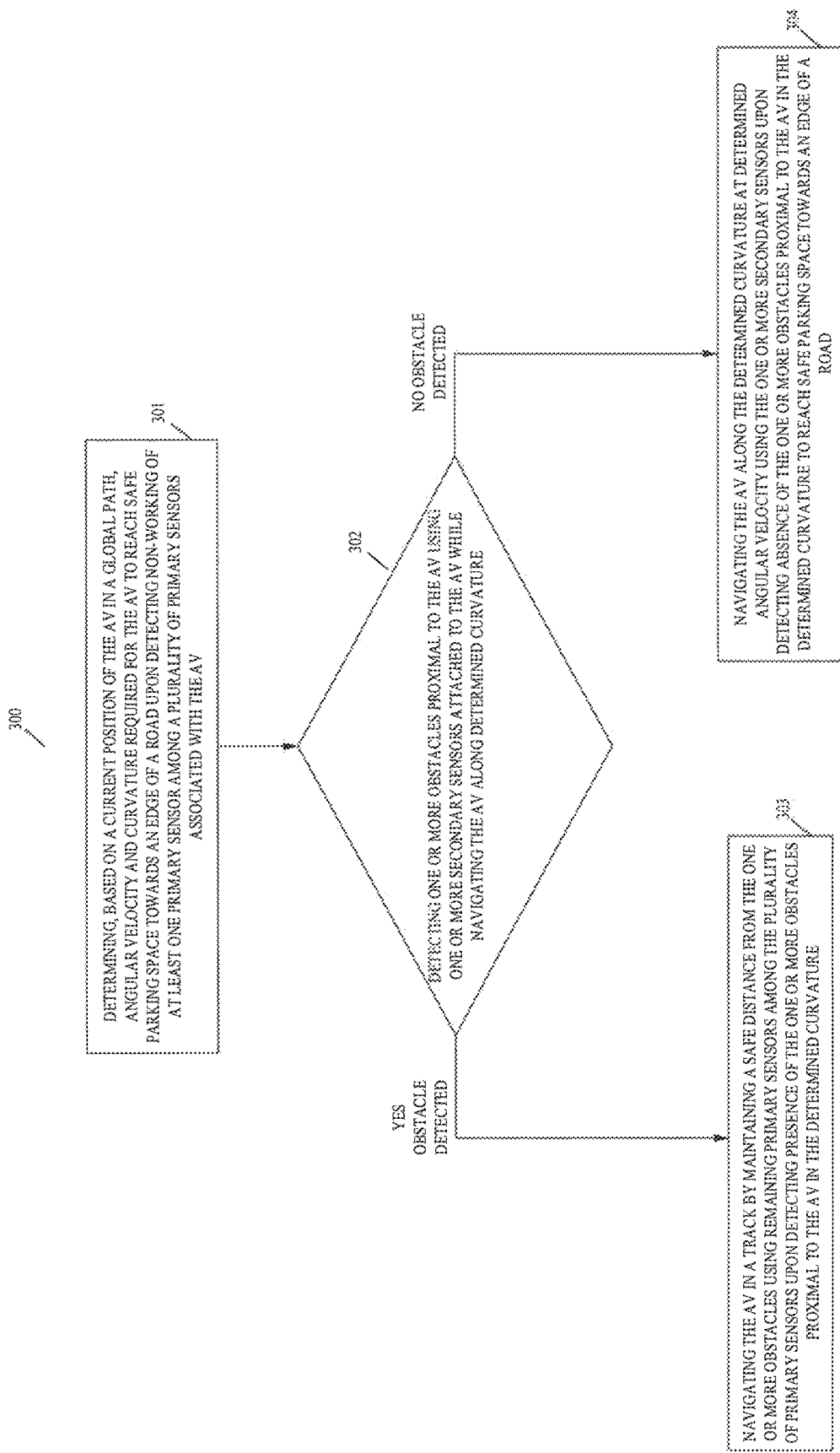
FIG. 3 shows a flowchart illustrating method steps for safely parking an autonomous vehicle on sensor anomaly, in accordance with some embodiment of the present disclosure.

FIG. 3 shows a flowchart illustrating method steps for safely parking an AV (102) on sensor anomaly, in accordance with some embodiment of the present disclosure. The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the navigation unit (200) upon detecting the non-working of at least one primary sensor among the plurality of primary sensors (104) associated with the AV (102), may determine an angular velocity and curvature (107) required for the AV (102) to reach a safe parking space towards an edge of a road, based on a current position of the AV (102) in a global path. In an embodiment, the global path may include a planned trajectory from a source location to the destination location. The non-working of the at least one primary sensor among the plurality of primary sensors (104) associated with the AV (102) may be detected by the navigation unit (200) based on inputs received from the plurality of primary sensors (104).

In an embodiment, the navigation unit (200) may determine the angular velocity and the curvature (107) by identifying a portion of the global path subsequent to the current position of the AV (102) to be at least one of a straight path or a path having a curve to a direction opposite to the safe parking space for selecting a predefined angular velocity and a predefined curvature from a trajectory performance profile (205). In an embodiment, for a right-handed driving system, the safe parking space may be towards the left end of the road (101), therefore the path having a curve towards the right of the AV (102) may be regarded as the path having curve to a direction opposite to the safe parking space. In another embodiment, for a left-handed driving system, the safe parking space may be towards the right end of the road (101), therefore the path having a curve towards the left of the AV (102) may be regarded as the path having curve to a direction opposite to the safe parking space.

In an embodiment, the navigation unit (200) may select the predefined angular velocity and a predefined curvature from a trajectory performance profile (205) based on a current speed of the AV (102), a current load of the AV (102) and the like.

Further, the navigation unit (200) may identify the portion of the global path subsequent to the current position of the AV (102), the path having the curve on a direction similar to the safe parking space for selecting the angular velocity from the trajectory performance profile (205) to follow the curve more than a measured curvature (401). Herein, the measured curvature (401) may be computed by determining at least one of a road width, a lane information, a current velocity of the AV (102) and a distance to reach the safe parking space using the remaining primary sensors from the plurality of primary sensors (104) that are in working condition and the one or more secondary sensors (105). In an embodiment, for a right-handed driving system, the path having a curve towards the left of the AV (102) may be regarded as the path having a curve on the direction similar to the safe parking space. For a left-handed driving system, the path having a curve towards the right of the AV (102) may be regarded as the path having a curve on the direction similar to the safe parking space.

As shown in FIG. 4A, FIG. 4B, and FIG. 4C the AV (102) present at a "POSITION-A" detects the non-working of at least one primary sensor among the plurality of primary sensors (104) associated with the AV (102). The AV (102) using the global path from the current position denoted as "POSITION-A" may identify the portion of the global path subsequent to the current position ("POSITION-A") of the AV (102). The portion of the global path may be at least one of a straight path as shown in FIG. 4B, a curve towards the right side of the AV (102) from the current position ("POSITION-A") of the AV (102) FIG. 4A and a curve towards the left side of the AV (102) from the current position ("POSITION-A") of the AV (102) as shown in FIG. 4C.

Considering a right-handed driving system, the portion of the global path having a curve to the right may be regarded as the path having a curve opposite to the safe parking space ("POSITION-B") as shown in FIG. 4A. Further, the portion of the global path having a curve towards the left direction of the AV (102) may be regarded as the path having a curve on the same direction of the safe parking space ("POSMON-B") as shown in FIG. 4C. Therefore, for the portion of the global path having the straight path as shown in FIG. 4B or the path having the curve towards the right as shown in FIG. 4A, the AV (102) may select a predefined angular velocity and a predefined curvature from the trajectory performance profile (205) for navigating to the safe parking space ("POSITION-B") as shown in FIG. 4A and FIG. 4B. The navigation unit (200) may navigate the AV (102) using a guided shifting of the AV (102) to reach the safe parking space as shown in FIG. 9. Furthermore, for the portion of the global path having the curve towards the left side of the AV (102) as shown in FIG. 4C, the measured curvature (401) may be computed by determining at least one of a road width, a lane information, a current velocity of the AV and a distance to reach the safe parking space ("POSITION-B") using the remaining primary sensors from the plurality of primary sensors (104) that are in working condition and the one or more secondary sensors (105). Thereafter, the AV (102) may select the angular velocity from the trajectory performance profile (205) to follow the curve denoted as determined curvature (107) more than a measured curvature (401) for navigating to the safe parking space ("POSITION-B") as shown in FIG. 4C. For example, the determined curvature (107) may be set to twice the measured curvature (401).

Figure 4D:
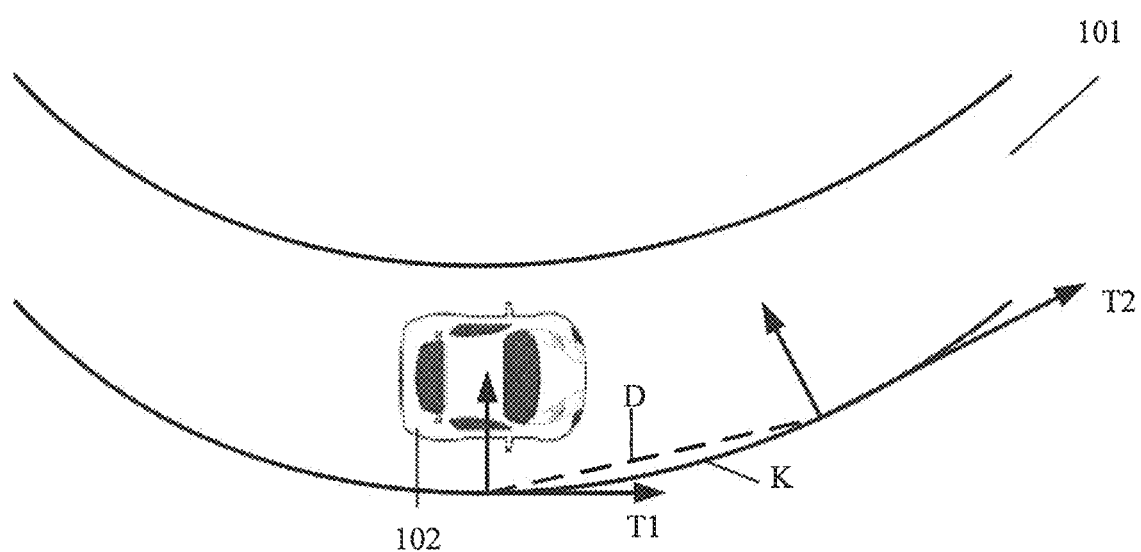
FIG. 4D shows an exemplary determination of a curvature, in accordance with some embodiments of the present disclosure.

In an embodiment, the curvature may be determined as a ratio of variation in the combination of the linear and angular velocities consecutively applied to the AV (102) and a distance covered by the AV (102) within the time duration of application of the combination of the linear and angular velocities. As shown in FIG. 4D, the curvature denoted as "K" may be determined using the consecutively applied combination of the linear and angular velocities denoted by "T1" and "T2" and the instantaneous distance covered by the AV (102) denoted by "D". The curvature "K" may be determined using the equation given below:

$$K = \frac{T1 - T2}{D} \quad (1)$$

Referring back to FIG. 3, at the step 302, the navigation unit (200) may detect the one or more obstacles (103) proximal to the AV (102) using the one or more secondary sensors (105) attached to the AV (102), while navigating the AV (102) along determined curvature (107).

In an embodiment, the navigation unit (200) may detect the presence of one or more obstacles (103) proximal to the AV (102) by detecting at least one of the one or more obstacles (103) in front of the AV (102) and the one or more obstacles behind the AV (102) while navigating the AV (102) along the determined curvature. Further, the navigation unit (200) may determine the distance of the one or more obstacles (103) detected to the AV (102).

Figure 5:
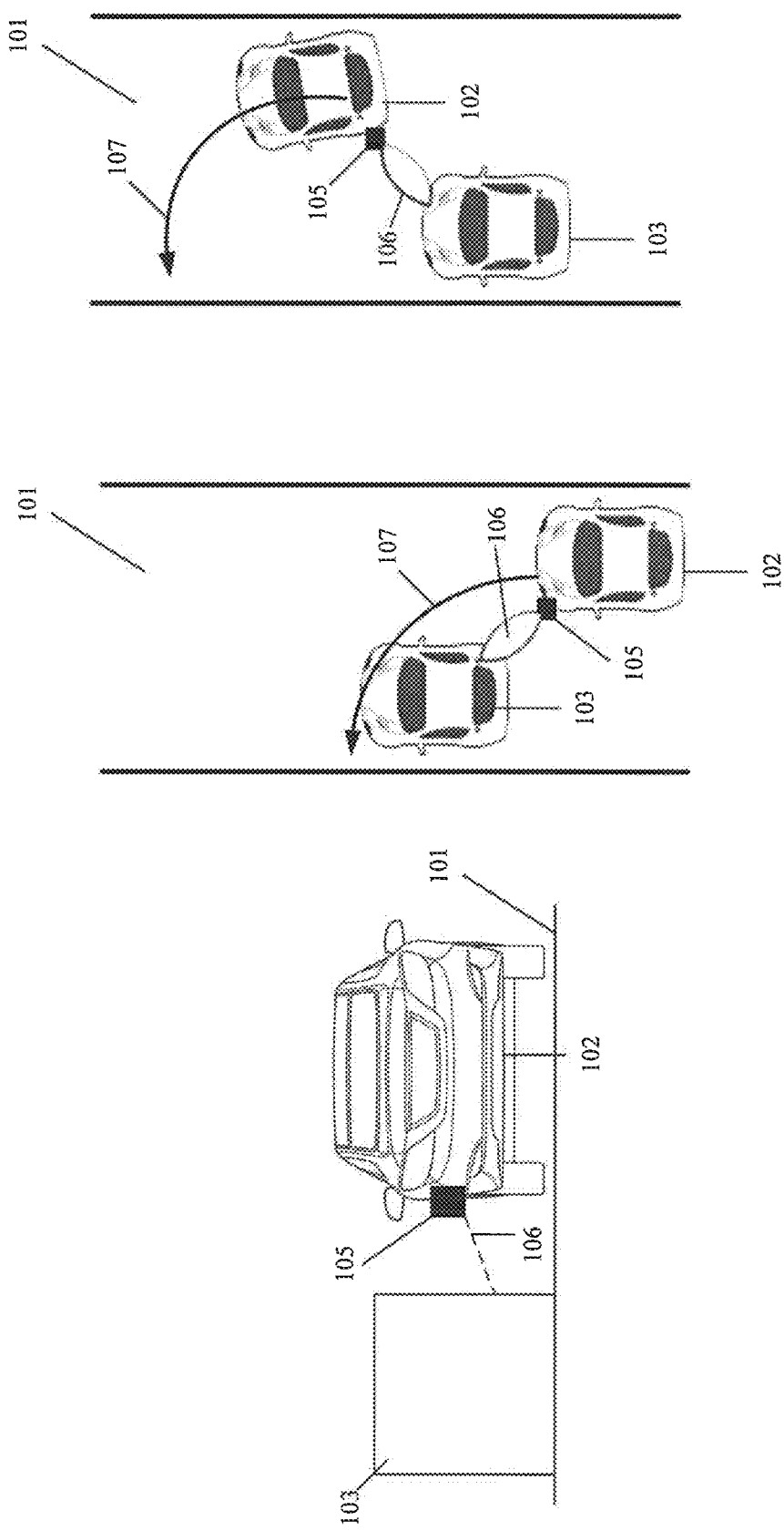
FIG. 5 shows an exemplary detection of one or more obstacles by an autonomous vehicle, in accordance with some embodiments of the present disclosure.

As shown in FIG. 5, the navigation unit (200) may detect the presence of the one or more obstacles (103) proximal to the AV (102) using the one or more secondary sensors (105). In an exemplary embodiment, the ultrasonic sensors may be used as one or more secondary sensors (105). The ultrasonic sensors may emit sound signals (106) at a frequency greater than the frequency of audio range required for humans to hear. The ultrasonic sensors may wait for the sound signals (106) to be reflected back from the one or more obstacles (103). Further, the navigation unit (200) may calculate the distance to the one or more obstacles (103) from the AV (102) based on the time required for the reflected sound signals to reach the ultrasonic sensors and the speed of the emitted sound signals using the equation (1).

In an embodiment, the navigation unit (200) may detect one or more obstacles (103) adjacent to the AV (102) as shown in FIG. 5. Further, the navigation unit (200) may detect the one or more obstacles (103) in front of the AV (102) along the determined curvature (107) as shown in FIG. 5. Furthermore, the navigation unit (200) may detect the one or more obstacles (103) behind the AV (102) and approaching the AV (102), along the determined curvature (107) as shown in FIG. 5.

Referring back to FIG. 3, at the step 303, the navigation unit (200) may navigate the AV (102) in a track along the road (101), by maintaining a safe distance from the one or more obstacles (103) using remaining primary sensors among the plurality of primary sensors (104) upon detecting presence of the one or more obstacles (103) proximal to the AV (102), in the determined curvature (107). In an embodiment, based on the one or more obstacles (103) detected proximal to the AV and the distance to the one or more obstacles (103) from the AV (102), the navigation unit (200) may decide to navigate the AV (102) in the track distinct from the determined curvature (107) to avoid collision with the one or more obstacles (103). The navigation unit (200) may continue to navigate the AV (102) in a track distinct from the determined curvature (107) until the one or more obstacles (103) are far away from the AV (102) and not proximal to the AV (102).

The navigation unit (200) may navigate the AV (102) along the track upon detecting the one or more obstacles (103) using the remaining primary sensors including an image sensor by identifying one or more lane markers (601) present on the track in the road (101). Further, the navigation unit (200) may measure a horizontal distance between the AV (102) and a lane marker among the one or more lane markers (601) adjacent to the AV (102). Furthermore, the navigation unit (200) may navigate the AV (102) by maintaining the horizontal distance between the AV (102) and the one or more lane markers (601) by applying a combination of linear and angular velocities for navigating the AV (102). The navigation unit (200) may validate the track following of the AV (102) with a working IMU primary sensor.

Figure 6:
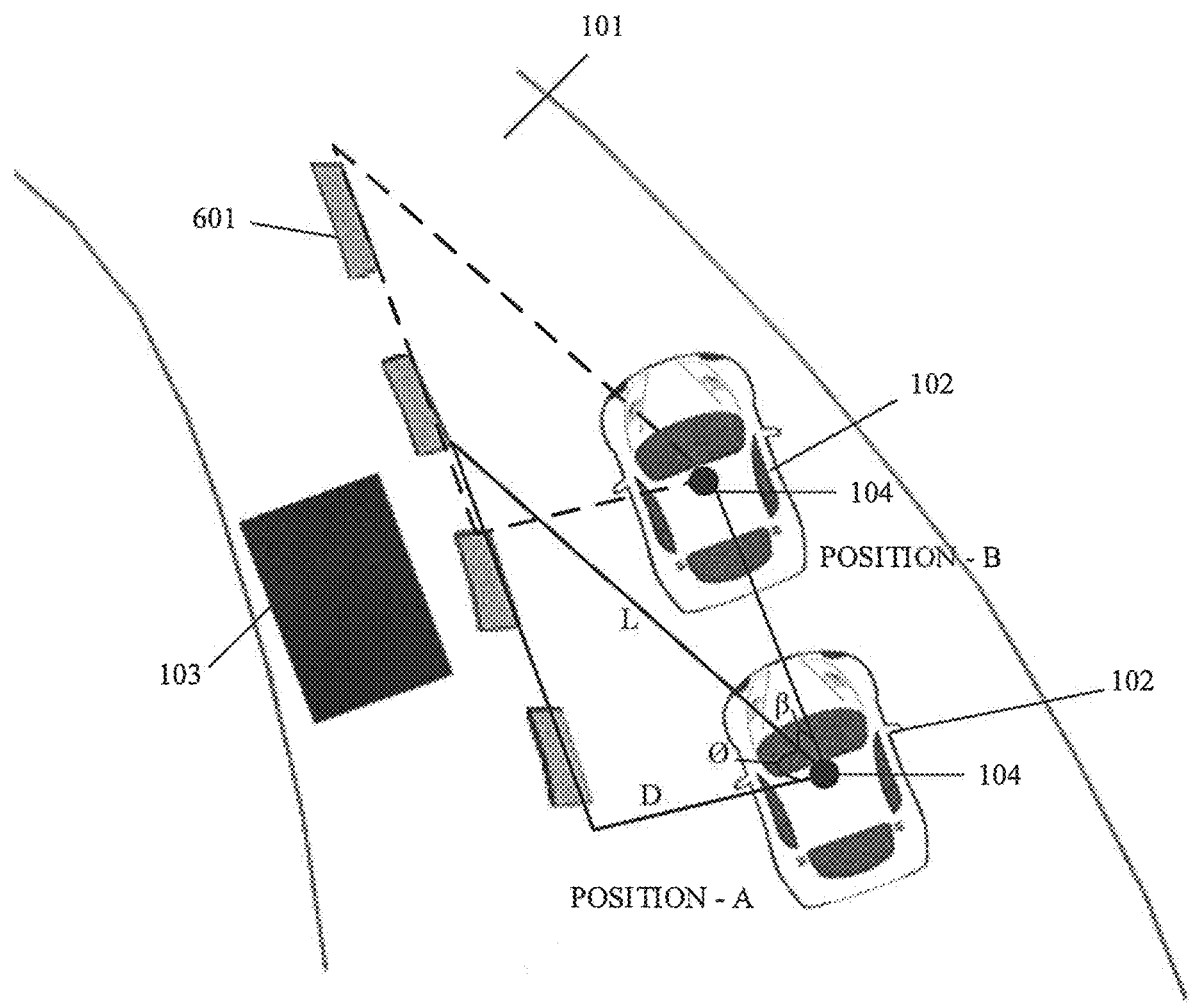
FIG. 6 shows an exemplary navigation of an autonomous vehicle along the track upon detecting the one or more obstacles using an image sensor, in accordance with some embodiments of the present disclosure.

As shown in FIG. 6, the navigation unit (200) may use an imaging sensor for example an visible light camera, infrared camera and the like, to identify the one or more lane markers (601) and an orientation of the one or more lane markers (601) from the AV (102) for navigating the AV (102) by maintaining a safe distance from the one or more obstacles (103). The distance and orientation of the one or more lane markers (601) from the AV (102) may be computed using the existing image processing techniques.

As shown in FIG. 6, the AV (102) at "POSITION-A" on the road (101) may identify at least one lane marker among the one or more lane markers (601) at distance denoted as "L" from the AV (102). Based on the distance "L" an angle of visibility denoted as 'β' may be measured using the existing image processing techniques. The navigation unit (200) may compute the horizontal distance denoted as "D" between the AV (102) and the one or more lane markers (601) using the equation given below:

$$D = L * \cos(\emptyset) \tag{2}$$

where $\emptyset = 90 - \beta$, as shown in FIG. 6. Further, the navigation unit (200) may navigate the AV (102) (for example from "POSITION-A" to "POSITION-B") by applying the combination of linear and angular velocities, along the track on the road (101) by maintaining the horizontal distance "D" between the AV (102) and the one or more lane markers (601) as shown in FIG. 6. In an embodiment, the one or more lane markers (601) beyond a threshold distance "Lg." may not be identified for computing the horizontal distance "D".

In an embodiment, if the angle of visibility 'P' increases, due to a curve in the leftward direction from the AV (102) in the track along the road (101), 'Ø' will decrease and the horizontal distance 'D' increases due to the AV (102) navigating to the rightward direction of the road (101). Therefore, the navigation unit (200) may generate and apply the combination of linear and angular velocities to navigate the AV (102) towards leftward direction of the road (101) until the horizontal distance of 'D' is maintained.

In another embodiment, if the angle of visibility 'β' decreases, due to a curve in the rightward direction from the AV (102) in the track along the road (101), 'Ø' will increase and the horizontal distance 'D' increases due to the AV (102) navigating to the leftward direction of the road (101). Therefore, the navigation unit (200) may generate and apply the combination of linear and angular velocities to navigate the AV (102) towards rightward direction of the road (101) until the horizontal distance of 'D' is maintained.

The navigation unit (200) may navigate the AV (102) along the track upon detecting the one or more obstacles (103) using the remaining primary sensors including a LiDAR sensor, by identifying a closest straight line (701) from a plurality of straight line clusters in parallel to vehicle orientation within a Field of View (FOV) of the AV (102), wherein the plurality of straight line clusters are a reflection of LiDAR sensor rays projected on the one or more obstacles (103) proximal to the AV (102). Further, determining orientation of the closest straight line (701) and maintaining the orientation of the closest straight line (701) by applying the combination of linear and angular velocities to the AV (102) for navigating the AV (102).

Figure 7:
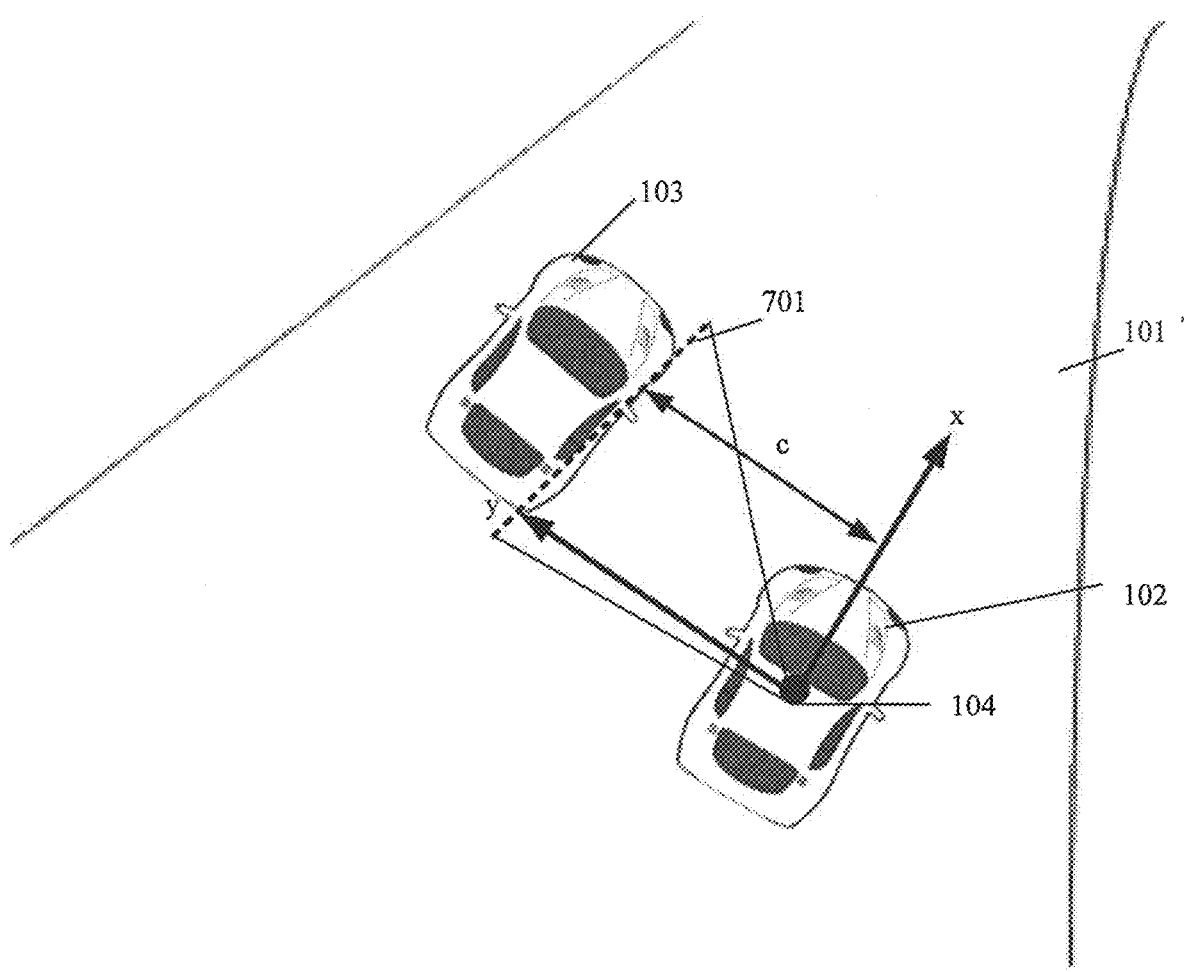
FIG. 7 shows an exemplary navigation of an autonomous vehicle along the track upon detecting the one or more obstacles using a Light (LiDAR) sensor, in accordance with some embodiments of the present disclosure.

As shown in FIG. 7, the navigation unit (200) navigates the AV (102) along the track in the road (101) by maintaining the same orientation with at least one obstacle among the one or more obstacles (103) using a LiDAR sensor. In an embodiment, the at least one obstacle may include at least one vehicle proximal to the AV (102) moving on the road (101) in the direction of the determined curvature (107). The LiDAR sensor of the AV (102) may receive reflection of the emitted LiDAR sensor rays from the at least one vehicle proximal to the AV (102). The reflection of the emitted LiDAR sensor rays may include a cluster of straight lines within the Field of View (FOV). The navigation unit (200) may identify one of the closest straight line (701) parallel to the AV (102) in the direction of the determined curvature (107) from the cluster of straight lines within FOV obtained from reflection of the emitted LiDAR sensor rays. Further, the navigation unit (200) may determine the orientation of the closest straight line (701) parallel to the AV (102) by computing a slope denoted as "m" and an intercept denoted as "c". The slope "m" may be computed using the equation given below:

$$m = \frac{(y1 - y2)}{(x1 - x2)} \tag{3}$$

where (x1, y1) and (x2, y2) denote two LiDAR points (with respect to a LiDAR frame) of closest straight line (701) identified from the cluster of straight lines. The intercept "c" may be computed using the one of the LiDAR point (x1, y1), the computed slope "m", and an equation of a straight line given below:

$$y1 = m * x1 + c \tag{4}$$

Further, the navigation unit (200) may navigate the AV (102) by maintaining the orientation of the closest straight line (701). For navigating the AV (102) in the determined orientation, the navigation unit (200) may modify the generated and applied combination of linear and angular velocities by adding or subtracting at least one of a positive or a negative angular velocity to the generated combination of linear and angular velocities. In an embodiment, if the orientation of the closest straight line (701) increases from "m" to "m+Δ", then the navigation unit (200) may apply the combination of linear and angular velocities to the AV (102) in a suitable direction until the orientation of the AV (102) with the closest straight line (701) reaches "m". In an embodiment, the value of the slope "m" may be equal to a value 1 when the forward axis of the LiDAR sensor is in parallel to the one or more obstacles (103).

The navigation unit (200) may navigate the AV (102) along the track upon detecting the one or more obstacles (103) using the remaining primary sensors including an Inertial Measurement Unit (IMU) sensor by computing the current position of the AV (102), after applying the combination of linear and angular velocities from the velocity-distance profile data (209) over a predefined time interval and a distance covered by the AV (102). Further, the navigation unit (200) may compare the current position of the AV (102) with a reference map to identify next portion of road segment to be followed along the track. Furthermore, the navigation unit (200) may determine the combination of linear and angular velocities from the velocity-distance profile data (209) as shown in TABLE-1 of FIG. 13 based on the next portion of the road segment from the current position of the AV (102) and apply the combination of linear and angular velocities determined for navigating the AV (102).

Figure 8:
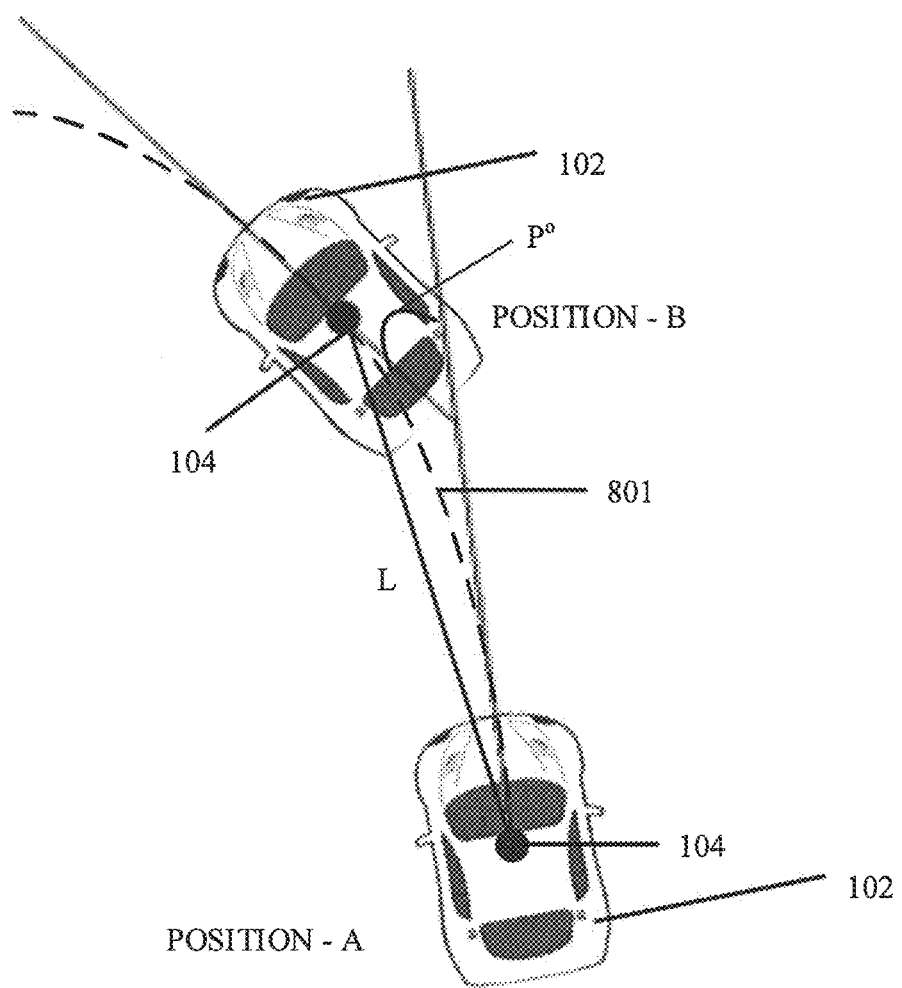
FIG. 8 shows an exemplary navigation of an autonomous vehicle along the track upon detecting the one or more obstacles using an Inertial Measurement Unit (IMU) sensor, in accordance with some embodiments of the present disclosure.

As shown in FIG. 8, the navigation unit (200) may use an IMU and wheel encoder for navigating the AV (102) along the track in the road (101) upon detecting the one or more obstacles (103). The navigation unit (200) may compute the current position ("POSITION-A") of the AV (102) based on the velocity-distance profile data (209) and the reference map. The navigation unit (200) based a current position ("POSITION-A") of the AV (102) in the reference map and a road (101) curvature ahead of the AV (102) may be obtained from the IMU sensor based on the previously applied combination of the linear and angular velocities and the velocity-distance profile data (209). The navigation unit (200) may determine the next portion of the road segment ahead of the AV (102) to be straight or having a "P" degree turn based on the IMU orientation change and velocity-distance profile data (209). The navigation unit (200) may determine the distance of the next portion of the road segment ahead of the AV (102) denoted as "L" meter based on the wheel encoder. The navigation unit (200) may determine the combination of linear and angular velocities from the velocity-distance profile data (209) for navigating the AV (102) along the determined next portion of the road segment (801) ahead of the AV (102) from "POSITION-A" to "POSITION-B" as shown in FIG. 8. For example, the navigation unit (200) may determine to achieve a 20° turn within a distance of 5 meters. Let the current linear velocity of the AV (102) be 40 km/s, based on the velocity-distance profile data (209) the maximum angle shift achievable by the AV (102) per second may be 3.5° and the distance covered in 5 seconds may be 10 meters. Therefore, the maximum turn navigable by the AV (102) may be t*3.5°, where "t" may be the time duration of the application of the angular velocity to the AV (102). If t*3.5° is lesser than 20°, then the navigation unit (200) may reduce the linear velocity of the AV (102) to achieve a higher angular orientation within the distance of 10 meters to navigate the AV (102) in the determined next portion of the road segment (801) from the current position of the AV (102). If t*3.5° is greater than 20°, the navigation unit (200) may apply less torque corresponding to the angular velocity to reduce the per second angular orientation of the AV (102) less than a maximum value of t*3.5°.

Further, the new position of the AV (102) may be determined by adding the distance denoted as "D" travelled by the AV (102) upon the application of the combination of linear and angular velocities. The distance "D" may be determined using the applied combination of linear and angular velocities denoted as "S" for time duration of "t" seconds using the velocity-distance profile. Further, the navigation unit (200) may refer to the reference map and determine the next portion of the road segment from the current position of the AV (102). Thus, the navigation unit (200) may navigate the AV (102) based on a tentative calculation of a shifted position of the AV (102) with respect to the reference map.

Referring back to FIG. 3, at the step 304, the navigation unit (200) may navigate the AV (102) along the determined curvature (107) at determined angular velocity using the remaining primary sensors among the plurality of primary sensors (104) and the one or more secondary sensors (105) upon detecting absence of the one or more obstacles (103) proximal to the AV (102) in the determined curvature (107) to reach safe parking space towards an edge of a road (101).

In an embodiment, the navigation unit (200) may navigate the AV (102) along the determined curvature (107) at the determined angular velocity by applying the determined angular velocity to the AV (102) for traversing in the determined curvature (107).

As shown in FIG. 9, the navigation unit (200) of the AV (102) at the "POSITION-A" on the road (101) detects the non-working of the at least one primary sensor among the plurality of sensors (104). The navigation unit (200) determines an angular velocity and a curvature required to safely park the AV (102) based on the current position of the AV (102). Further, the navigation unit (200) detects the absence of the one or more obstacles (103) proximal to the AV (102) and navigates the AV (102) along the determined curvature (107) to reach "POSITION-B" and thereafter to "POSITION-C".

Figure 10:
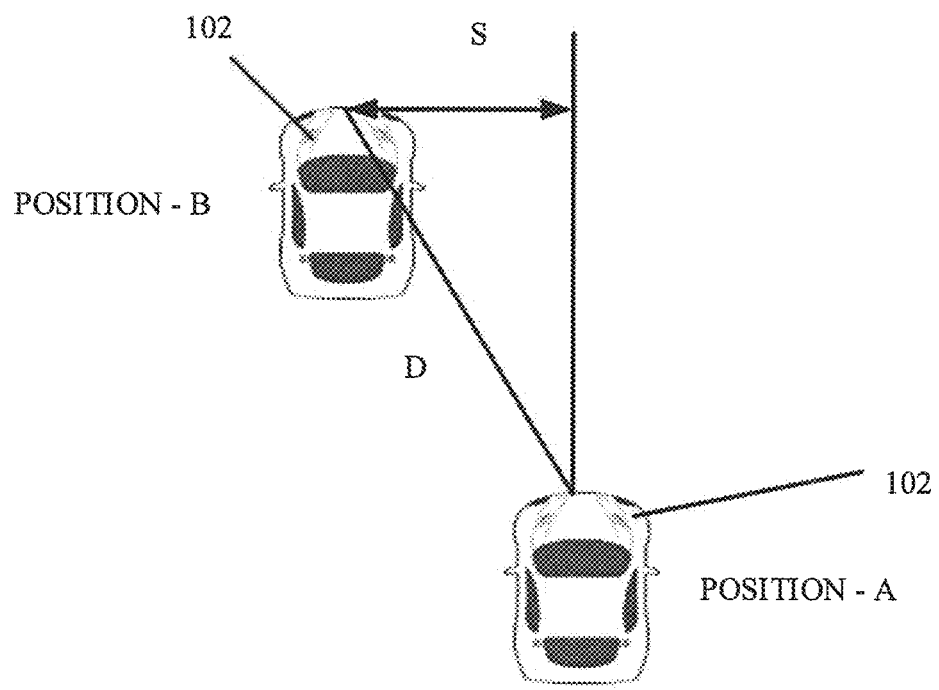
FIG. 10 shows an exemplary determination of new tentative position of an autonomous vehicle, in accordance with some embodiments of the present disclosure.

The navigation unit (200) may apply the determined angular velocity to the AV (102) as an impulsive velocity for traversing in the determined curvature (107) from "POSITION-A" on the road (101) to "POSITION-B" and thereafter to "POSITION-C". The impulsive velocity refers to gradually increasing the angular velocity from zero to a peak value and gradually decreasing it down to zero from the peak value. One such gradual increase of the angular velocity from zero to the peak value and gradual decrease from the peak value to zero may be denoted as a slot. The navigation unit (200) after applying one slot of angular velocity to the AV (102), determines a new tentative position of the AV (102) based on profile data. The new tentative position is determined as a combination of distance covered denoted as "D" by the AV (102) and the lateral shift denoted as "S" covered by the AV (102) as shown in FIG. 10. The distance covered by the AV (102) "D" is computed using the equation given below:

$$D = D_{linear} * K * \text{angular velocity applied} \quad (5)$$

Where $D_{linear}$ is a distance covered by AV (102) in "t" seconds at a linear velocity of "x" km/s corresponding to a weight condition of the AV (102), "K" is an experimental constant having value between 0 to 1. Further, the lateral shift "S" may be corresponding to the angular velocity applied may be determined form the profile data. The combination of the distance covered, and the lateral shift determines the new tentative position of the AV (102). As shown in FIG. 10, the AV (102) in "POSITION-A" applies for example, the angular velocity of 0.8 rad at a linear velocity of 40 km/s for 5 s and let "K" be 1. Therefore, "$D_{linear}$" may be retrieved from the trajectory performance profile (205) corresponding to the linear velocity of 40 km/s and time of 5 s as 16 m. The distance covered "D" may be computed using the equation (5) as 12.8 m as shown in FIG. 10. Further, the lateral shift "S" corresponding to the angular velocity of 0.8 rad applied to the AV (102) may be selected from the profile data as 0.35 m as shown in FIG. 12. The new tentative position of the AV (102) is at "POSITION-B" as shown in FIG. 10 with the distance of 12.8 m and a lateral shift of 0.35 m covered by the AV (102).

Referring back to FIG. 9, at the "POSITION-C", the navigation unit (200) detects the presence of the one or more obstacles (103) proximal to the AV (102) using the one or more secondary sensors (105). The navigation unit (200) navigates the AV (102) from "POSITION-C" to "POSITION-D" by maintaining a safe distance from the one or more obstacles (103) using the remaining primary sensor among the plurality of primary sensors (104). Further, at the "POSITION-D", the navigation unit (200) detects the absence of the one or more obstacles (103) and navigates the AV (102) along the determined curvature (107) using the trajectory performance profile (205) as shown in FIG. 12, from "POSITION-D" to "POSITION-H" via "POSITION-E", "POSITION-F", "POSITION-G" by applying the determined angular velocity as the impulsive velocity as shown in FIG. 9. Finally, the navigation unit (200) safely parks the AV (102) at the "POSITION-H" upon detecting the reaching of the safe parking space by the AV (102), using the one or more secondary sensors (105).

In an embodiment, the navigation unit (200) may detect the reaching of the safe parking space by the AV (102), using the one or more secondary sensors (105) by identifying at least one of a pedestrian area within a predefined distance from the AV (102) and a low lying area with respect to the edge of the road (101) within the predefined distance from the AV (102).

Figure 11:
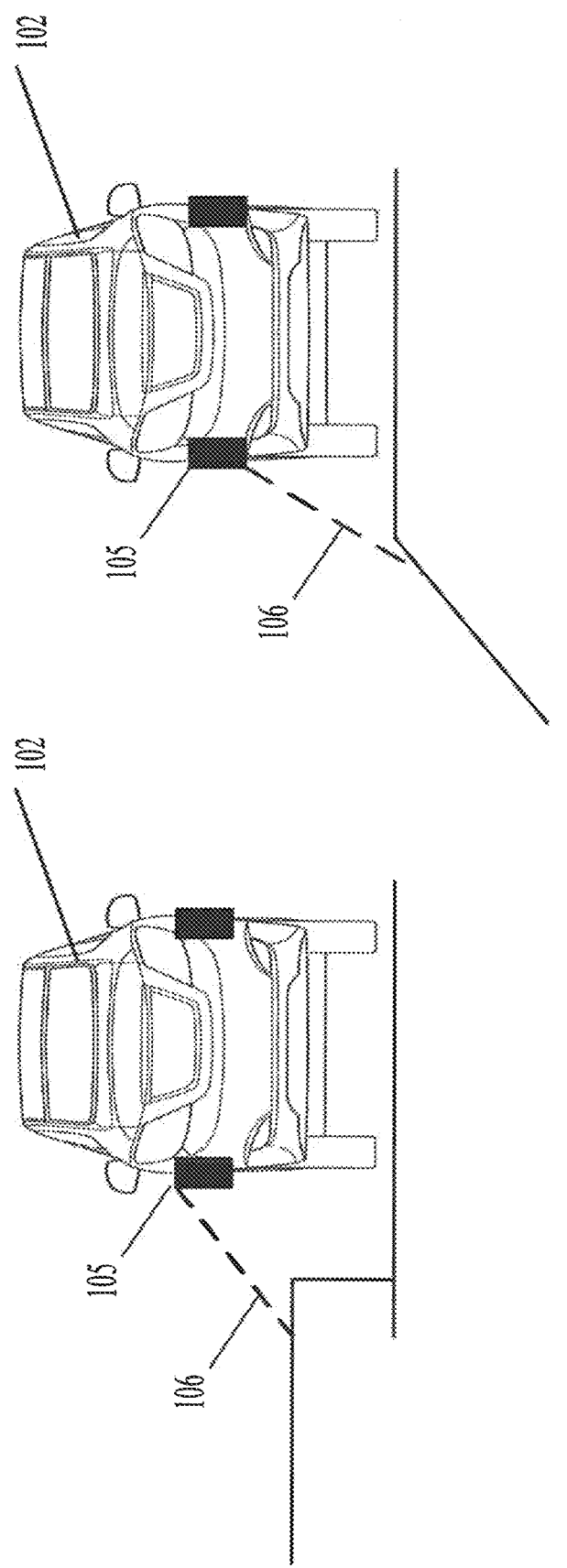
FIG. 11 shows an exemplary detection of reaching of safe parking space by an autonomous vehicle, in accordance with some embodiments of the present disclosure.

As shown in FIG. 11, the navigation unit (200) may detect the reaching of the safe parking space by the AV (102), using the one or more secondary sensors (105). Based on the signals received due to reflection of the emitted signals from the one or more secondary sensors (105) the distance of the safe parking space may be computed using the equation (1). Further, if the computed distance of the safe parking space is lesser than the predefined distance from the AV (102) for example 2 meters, the navigation unit (200) may identify the safe parking of the AV (102).

In an embodiment, the distance of the pedestrian area from the AV may be lesser than the predefined distance from the road (101) to the AV (102), thus the navigation unit (200) detects the reaching of the safe parking space by the AV (102) as shown in FIG. 11.

In another embodiment, the distance of the low lying area from the AV may be greater than the predefined distance from the road (101) to the AV (102), thus the navigation unit (200) detects the reaching of the safe parking space by the AV (102).

The method for safely parking the AV (102) on sensor anomaly includes determining an angular velocity and curvatures required to safely park the AV (102) upon detecting the non-working of the at least one primary sensor. The one or more obstacles (103) in the determined curvature (107) and reaching of the safe parking space by the AV (102) may be determined using the one or more secondary sensors (105). Further, upon detecting one or more obstacles (103), the AV (102) may navigate along the track by maintaining a safe distance from the one or more obstacles using the remaining primary sensors among the plurality of primary sensors (104).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 101 | Road |
| 102 | Autonomous Vehicle (AV) |
| 103 | One or more obstacles |
| 104 | Plurality of primary sensors |
| 105 | One or more secondary sensors |
| 106 | Signal |
| 107 | Determined Curvature |
| 200 | Navigation Unit |
| 201 | I/O Interface |
| 202 | Memory |
| 203 | Processor |
| 204 | Data |
| 205 | Trajectory Performance Profile |
| 206 | Curvature Data |
| 207 | Sensor Data |
| 208 | Obstacle Data |
| 209 | Velocity-distance profile Data |
| 210 | Other Data |
| 211 | Modules |
| 212 | Sensor failure detection Module |
| 213 | Safe parking detection Module |
| 214 | Curvature Measuring Module |
| 215 | Obstacle detection Module |
| 216 | Image sensor Module |
| 217 | LiDAR sensor Module |
| 218 | Inertial Measurement Unit Sensor Module |
| 219 | Other Module |
| 401 | Measured Curvature |
| 601 | One or more lane markers |

-continued

| Reference number | Description |
| --- | --- |
| 701 | Closest straight line |
| 801 | Determined next portion of the road segment |

We claim:

1. A method for safely parking an autonomous vehicle (AV), the method comprising:
determining, based on a current position of the AV in a global path, by a navigation unit, an angular velocity and curvature required for the AV to reach a safe parking space towards an edge of a road upon detecting non-working of at least one primary sensor among a plurality of primary sensors associated with the AV;
detecting, by the navigation unit, one or more obstacles proximal to the AV using one or more secondary sensors attached to the AV while navigating the AV along determined curvature; and
based on detecting the one or more obstacles proximal to the AV, performing, by the navigation unit:
navigating the AV in a track by maintaining a safe distance from the one or more obstacles using remaining primary sensors among the plurality of primary sensors upon detecting presence of the one or more obstacles proximal to the AV in the determined curvature, wherein navigating the AV along the track upon detecting the one or more obstacles using the remaining primary sensors including a lidar sensor, comprises:
identifying a closest straight line from a plurality of straight line clusters in parallel to vehicle orientation within a Field of View (FOV) of the AV, wherein the plurality of straight line clusters are a reflection of lidar sensor rays projected on the one or more obstacles proximal to the AV;
determining orientation of the closest straight line; and
maintaining the orientation of the closest straight line by applying the combination of linear and angular velocities to the AV for navigating the AV; and
navigating the AV along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

2. The method of claim 1, wherein determining the angular velocity and the curvature comprises:
identifying a portion of the global path subsequent to the current position of the AV to be at least one of a straight path or a path having curve in a direction opposite to the safe parking space for selecting a predefined angular velocity and a predefined curvature from a trajectory performance profile; or
identifying the portion of the global path subsequent to the current position of the AV to be a path having curve in the direction similar to the safe parking space for selecting the angular velocity from the trajectory performance profile to follow the curve more than a measured curvature, wherein the measured curvature is computed by determining at least one of a road width, a lane information, a current velocity of the AV and a distance to reach the safe parking space.

3. The method of claim 1, wherein detecting the presence of the one or more obstacles proximal to the AV comprises:
detecting at least one of the one or more obstacles in front of the AV and the one or more obstacles behind the AV in the direction of the determined curvature; and
determining distance of the one or more obstacles detected to the AV.

4. The method of claim 1, wherein navigating the AV along the determined curvature at the determined angular velocity comprises applying the determined angular velocity to the AV for traversing in the determined curvature.

5. The method of claim 1, wherein navigating the AV along the track upon detecting the one or more obstacles using the remaining primary sensors including an image sensor, comprises:
identifying one or more lane markers present on the track;
measuring a horizontal distance between the AV and a lane marker among the one or more lane markers adjacent to the AV; and
maintaining the horizontal distance between the AV and the one or more lane markers by applying a combination of linear and angular velocities for navigating the AV.

6. The method of claim 1, wherein navigating the AV along the track upon detecting the one or more obstacles using the remaining primary sensors including an Inertial Measurement Unit (IMU) sensor, comprises:
computing the current position of the AV, after applying the combination of linear and angular velocities from a velocity-distance profile over a predefined time interval and a distance covered by the AV;
comparing the current position of the AV with a reference map to identify next portion of road segment to be followed along the track;
determining the combination of linear and angular velocities from the velocity-distance profile based on the next portion of the road segment from the current position of the AV; and
applying the combination of linear and angular velocities determined for navigating the AV.

7. The method of claim 1, further comprising detecting the reaching of the safe parking space by using the one or more secondary sensors for identifying a pedestrian area within a predefined distance from the AV.

8. A navigation unit for safely parking an autonomous vehicle (AV), comprising:
a plurality of primary sensors and one or more secondary sensors communicatively coupled to the navigation unit, wherein the one or more secondary sensors are configured to detect one or more obstacles proximal to the AV for navigating the AV, measure distance of an edge of a road, measure distance of a pedestrian surface and measure distance of a vehicle proximal to the AV; and the navigation unit comprising:
a processor; and
a memory communicatively coupled to the processor, wherein the memory stores the processor executable instructions, which, on execution, causes the processor to:
determine, based on a current position of the AV in a global path, an angular velocity and curvature required for the AV to reach a safe parking space towards an edge of a road upon detecting non-working of at least one primary sensor among a plurality of primary sensors associated with the AV;

detect one or more obstacles proximal to the AV using one or more secondary sensors attached to the AV while navigating the AV along determined curvature; and based on detecting the one or more obstacles proximal to the AV, perform at least one of:

navigating the AV in a track by maintaining a safe distance from the one or more obstacles using remaining primary sensors among the plurality of primary sensors upon detecting presence of the one or more obstacles proximal to the AV in the determined curvature, wherein navigating the AV along the track upon detecting the one or more obstacles using the remaining primary sensors including a lidar sensor, comprises:

identifying a closest straight line from a plurality of straight line clusters in parallel to vehicle orientation within a Field of View (FOV) of the AV, wherein the plurality of straight line clusters are a reflection of lidar sensor rays projected on the one or more obstacles proximal to the AV;

determining orientation of the closest straight line; and maintaining the orientation of the closest straight line by applying the combination of linear and angular velocities to the AV for navigating the AV; and navigating the AV along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

9. The navigation unit of claim 8, wherein the processor-executable instructions, on execution, further causes the processor to determine the angular velocity and the curvature comprises identifying a portion of the global path subsequent to the current position of the AV to be:

at least one of a straight path or a path having curve in a direction opposite to the safe parking space for selecting a predefined angular velocity and a predefined curvature from a trajectory performance profile; or a path having curve in the direction similar to the safe parking space for selecting the angular velocity from the trajectory performance profile to follow the curve more than a measured curvature, wherein the measured curvature is computed by determining at least one of a road width, a lane information, a current velocity of the AV and a distance to reach the safe parking space.

10. The navigation unit of claim 8, wherein the processor-executable instructions, on execution, further causes the processor to detect the presence of one or more obstacles proximal to the AV comprises:

detecting at least one of the one or more obstacles in front of the AV and the one or more obstacles behind the AV in the direction of the determined curvature; and determining distance of the one or more obstacles detected to the AV.

11. The navigation unit of claim 8, wherein the processor-executable instructions, on execution, further causes the processor to navigate the AV along the determined curvature at the determined angular velocity by applying the determined angular velocity to the AV for traversing in the determined curvature.

12. The navigation unit of claim 8, wherein the processor-executable instructions, on execution, further causes the processor to navigate the AV along the track upon detecting the one or more obstacles using the remaining primary sensors including an image sensor, comprises:

identifying one or more lane markers present on the track;

measuring a horizontal distance between the AV and a lane marker among the one or more lane markers adjacent to the AV; and maintaining the horizontal distance between the AV and the one or more lane markers by applying a combination of linear and angular velocities for navigating the AV.

13. The navigation unit of claim 8, wherein the processor-executable instructions, on execution, further cause the processor to navigate the AV along the track upon detecting the one or more obstacles using the remaining primary sensors including an Inertial Measurement Unit (IMU) sensor, comprises:

computing the current position of the AV, after applying the combination of linear and angular velocities from a velocity-distance profile over a predefined time interval and a distance covered by the AV;

comparing the current position of the AV with a reference map to identify next portion of road segment to be followed along the track;

determining the combination of linear and angular velocities from the velocity-distance profile based on the next portion of the road segment from the current position of the AV; and applying the determined combination of linear and angular velocities for navigating the AV.

14. The navigation unit of claim 8, wherein the processor-executable instructions, on execution, further causes the processor to further detect the reaching of the safe parking space by the AV, using the one or more secondary sensors by identifying a pedestrian area within a predefined distance from the AV.

15. A non-transitory computer readable medium including instructions stored thereon that when processed by at least one processor cause a device to perform operations comprising:

determining, based on a current position of the AV in a global path, an angular velocity and curvature required for the AV to reach a safe parking space towards an edge of a road upon detecting non-working of at least one primary sensor among a plurality of primary sensors associated with the AV;

detecting, one or more obstacles proximal to the AV using one or more secondary sensors attached to the AV while navigating the AV along determined curvature; and based on detecting the one or more obstacles proximal to the AV, performing at least one of:

navigating the AV in a track by maintaining a safe distance from the one or more obstacles using remaining primary sensors among the plurality of primary sensors upon detecting presence of the one or more obstacles proximal to the AV in the determined curvature, wherein navigating the AV along the track upon detecting the one or more obstacles using the remaining primary sensors including a lidar sensor, comprises:

identifying a closest straight line from a plurality of straight line clusters in parallel to vehicle orientation within a Field of View (FOV) of the AV, wherein the plurality of straight line clusters are a reflection of lidar sensor rays projected on the one or more obstacles proximal to the AV;

determining orientation of the closest straight line; and maintaining the orientation of the closest straight line by applying the combination of linear and angular velocities to the AV for navigating the AV; and navigating the AV along the determined curvature at determined angular velocity using the remaining primary sensors among the plurality of primary sensors and the one or more secondary sensors upon detecting absence of the one or more obstacles proximal to the AV in the determined curvature to reach the safe parking space towards the edge of the road.

16. The media of claim 15, wherein the instructions cause the device to determine the angular velocity and the curvature comprises:

identifying a portion of the global path subsequent to the current position of the AV to be at least one of a straight path or a path having curve in a direction opposite to the safe parking space for selecting a predefined angular velocity and a predefined curvature from a trajectory performance profile; or identifying the portion of the global path subsequent to the current position of the AV to be a path having curve in the direction similar to the safe parking space for selecting the angular velocity from the trajectory performance profile to follow the curve more than a measured curvature, wherein the measured curvature is computed by determining at least one of a road width, a lane information, a current velocity of the AV and a distance to reach the safe parking space.

17. The media of claim 15, wherein the instructions cause the device to detect the presence of the one or more obstacles proximal to the AV comprises:

detecting at least one of the one or more obstacles in front of the AV and the one or more obstacles behind the AV in the direction of the determined curvature; and determining distance of the one or more obstacles detected to the AV.

18. The media of claim 15, wherein the instructions cause the device to detect the reaching of the safe parking space by the AV, using the one or more secondary sensors by identifying a pedestrian area within a predefined distance from the AV.

* * * * *